United States Patent
Vincent et al.

(10) Patent No.: US 6,722,929 B2
(45) Date of Patent: Apr. 20, 2004

(54) UNIVERSAL CLAMP FOR A CYLINDRICAL ELEMENT, IN PARTICULAR FOR A CABLE

(75) Inventors: Alain Vincent, Juilly (FR); Rodolphe Apere, Andiesy (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/170,563

(22) Filed: Jun. 14, 2002

(65) Prior Publication Data
US 2002/0193017 A1 Dec. 19, 2002

(30) Foreign Application Priority Data
Jun. 15, 2001 (FR) ............................................. 01 08142

(51) Int. Cl.[7] .............................. H01R 4/38; H01R 4/30; H01R 11/09
(52) U.S. Cl. ........................................ 439/801; 439/787
(58) Field of Search ................................ 439/801, 804, 439/812, 787, 781, 797; 174/65 G

(56) References Cited

U.S. PATENT DOCUMENTS

| | | | | |
|---|---|---|---|---|
| 1,450,528 A | * | 4/1923 | Varney | 24/135 R |
| 4,708,418 A | * | 11/1987 | Reyna | 439/785 |
| 5,417,589 A | * | 5/1995 | Terada | 439/590 |
| 5,675,124 A | * | 10/1997 | Stough et al. | 174/65 G |
| 5,692,930 A | * | 12/1997 | Garver et al. | 439/781 |
| 6,129,586 A | * | 10/2000 | Bellemon | 439/607 |
| 2001/0032728 A1 | * | 10/2001 | Etmad-Moghadam | 174/65 G |

FOREIGN PATENT DOCUMENTS

| | | |
|---|---|---|
| BE | 412 553 A | 12/1935 |
| CH | 675 753 A | 10/1990 |
| DE | 78 19 892 U1 | 10/1978 |
| DE | 92 13 835.7 U1 | 12/1992 |
| EP | 0 211 710 A1 | 2/1987 |
| FR | 2 777 333 A1 | 10/1999 |
| GB | 643 812 A | 9/1950 |

* cited by examiner

Primary Examiner—Chandrika Prasad
(74) Attorney, Agent, or Firm—Sughrue Mion, PLLC

(57) ABSTRACT

The present invention relates to a set of fixing clamps for fixing a cylindrical element, each clamp being constituted by a block provided on one of its faces with a channel for receiving the cylindrical element, and also provided with clamping means. The set comprises a plurality of clamps having respective channels of different dimensions and connected to one another via at least one breakable element.

10 Claims, 3 Drawing Sheets

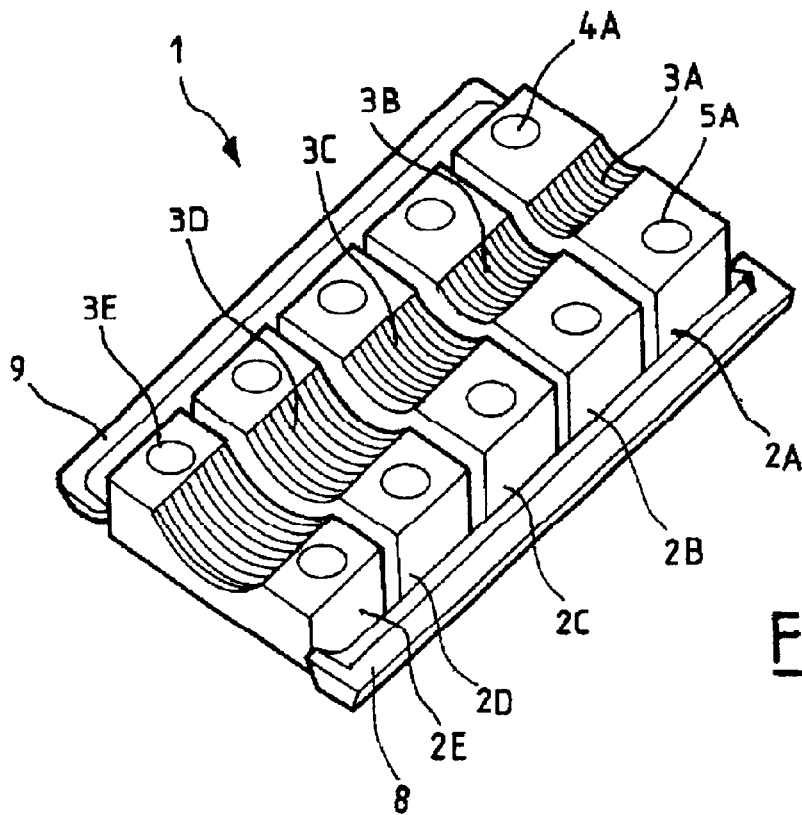
FIG_1
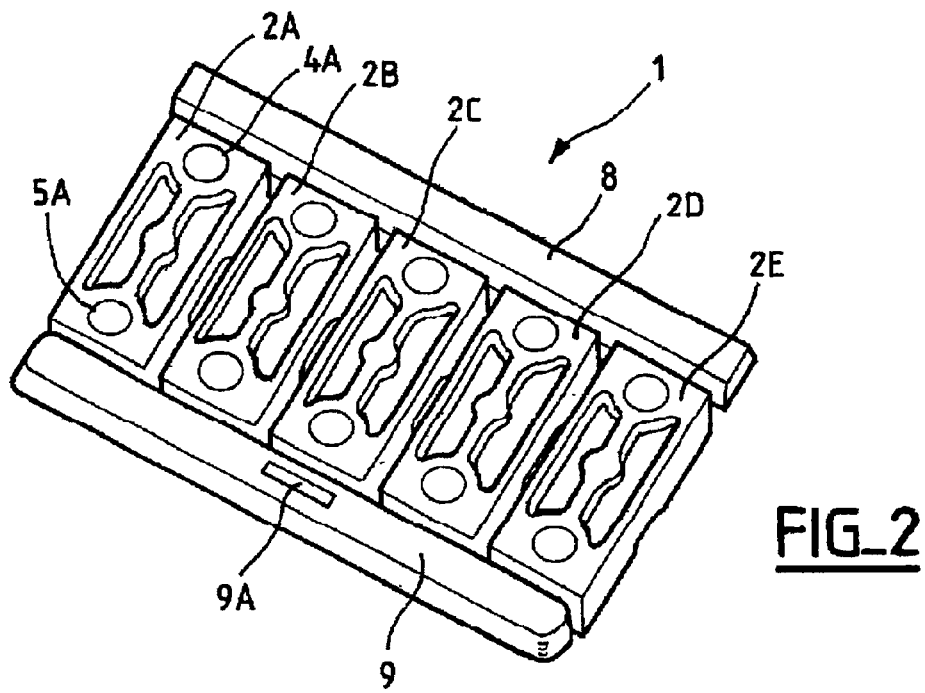
FIG_2

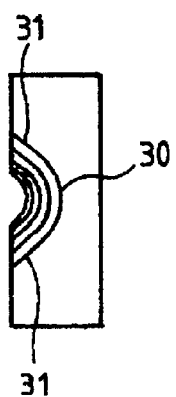
FIG_3
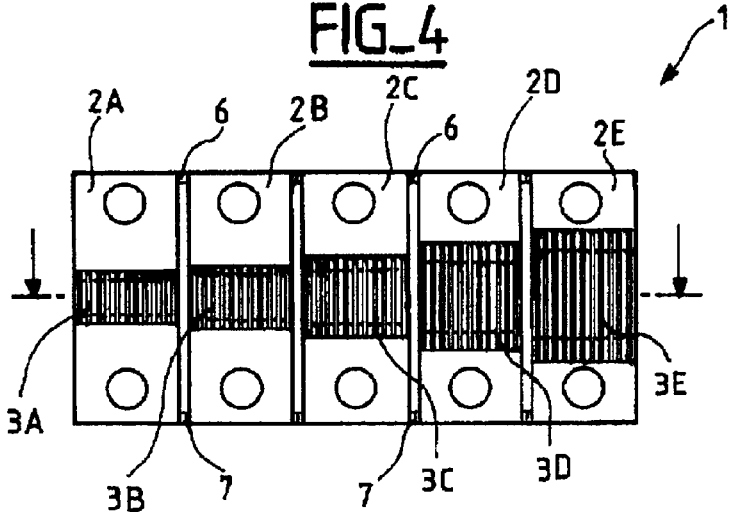
FIG_4
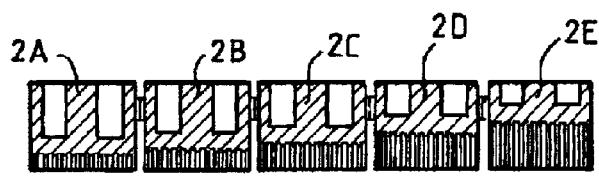
FIG_5
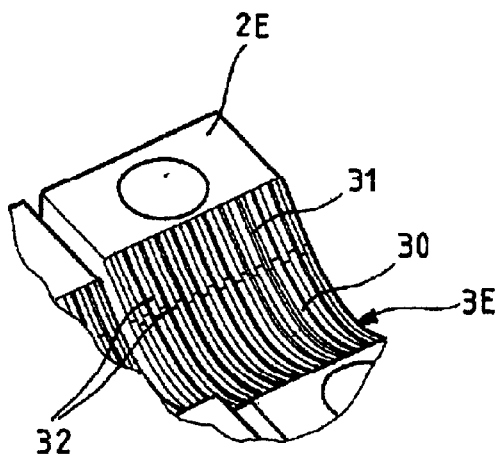
FIG_6

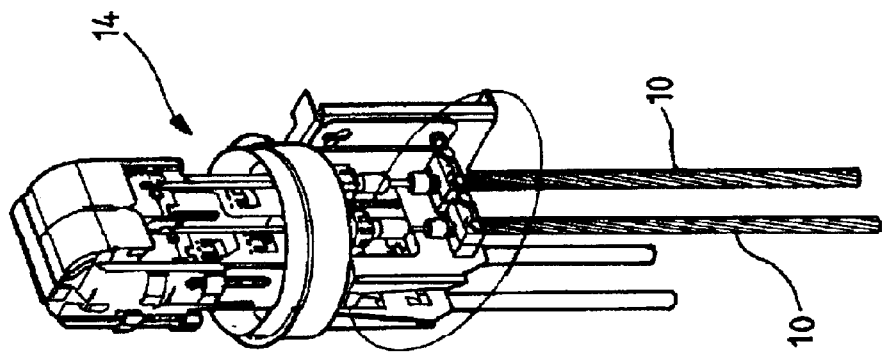
FIG_8
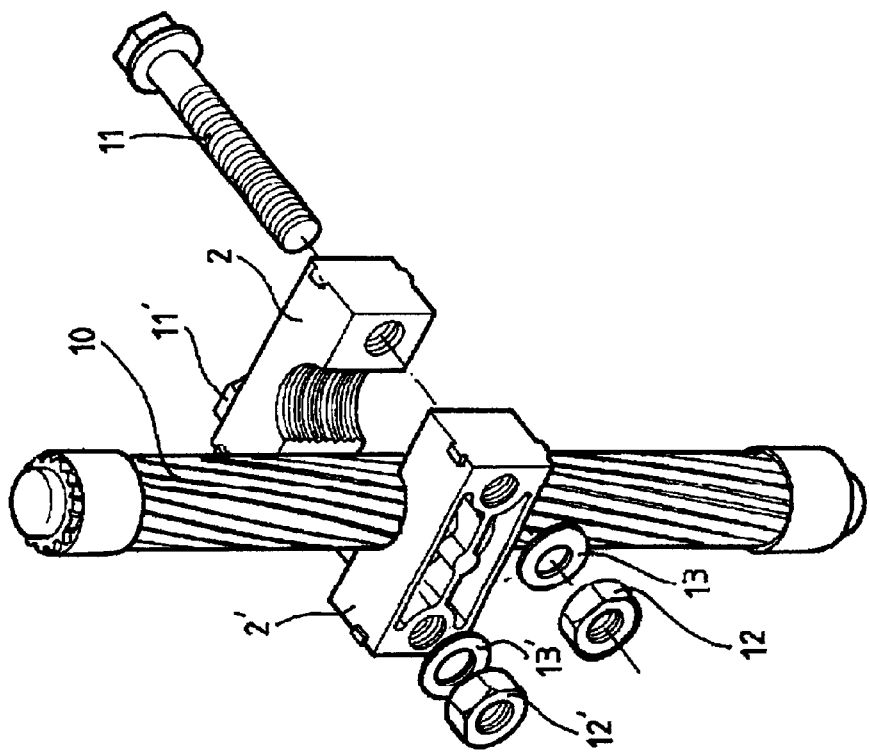
FIG_7

UNIVERSAL CLAMP FOR A CYLINDRICAL ELEMENT, IN PARTICULAR FOR A CABLE

The present invention relates to a universal clamp for a cylindrical element, in particular for a cable.

More precisely, the invention relates to a set of fixing clamps for cylindrical elements, each clamp comprising a block provided with a channel in one of its faces for receiving a cylindrical element, and with clamping means.

BACKGROUND OF THE INVENTION

Such known clamps are constituted by a block of machined metal and they are generally used in pairs. The cylindrical element, in particular a power cable or an optical fiber cable is held between two clamps and is received in the corresponding cylindrical channels. At present, these clamps are made individually with determined channel diameters.

Such clamps are made by machining since they would be too expensive to make by molding. Each cable diameter corresponds to a particular size of clamp, and thus to a particular part to be managed, specifically in terms of storage and assembly.

OBJECTS AND SUMMARY OF THE INVENTION

The invention solves this problem by proposing a single set of clamps suitable for fixing a very wide range of cable diameters. More precisely, and as explained below, the set is suitable for replacing up to 20 individual clamp references, while also being lower in cost than any one prior art clamp.

To do this, according to the invention, the set comprises a plurality of clamps having respective channels of different dimensions and connected to one another via at least one breakable element.

The breakable element can be broken manually or using a tool such as a saw or a screwdriver. In the conventional manner, it is advantageously constituted by narrow connection tongues.

In a preferred embodiment, the clamps are disposed in side-by-side alignment so as to form a strip of clamps, the sizes of the channels increasing from a first clamp to a last clamp.

Preferably, each channel has a bottom-of-channel portion of circular cross-section extended on either side by two end portions of sloping right cross-section.

This channel shape further enlarges the range of cable diameters that can be handled. For example, this shape can enable a single clamp to be used for fixing over a range of diameters, the width of each range being 2 millimeters (mm) to 5.5 mm, as explained below.

Advantageously, each channel is provided with parallel grooves extending perpendicularly to the longitudinal axis of the channel.

These grooves provide excellent contact pressure against the cable and enable a force of at least 100 kilograms (kg) to be retained, without damaging the cable.

In the conventional manner, such clamping means are constituted by bores each designed to receive a bolt.

The assembly is advantageously made of cast metal, and preferably of zamak.

In a preferred application of the invention, the cylindrical element is an optical fiber cable, and more precisely it may be a guard cable with incorporated optical fibers for fitting to electrical equipment.

BRIEF DESCRIPTION OF THE DRAWINGS

The invention is described below in greater detail with reference to figures that merely show a preferred embodiment of the invention.

FIGS. 1 and 2 are perspective views from above and from below showing a set of clamps in accordance with the invention.

FIGS. 3, 4, and 5 are a side view, a plan view from above, and a plan view from below of a set of clamps in accordance with the invention.

FIG. 6 is a detail view in perspective.

FIGS. 7 and 8 are perspective views of mountings including clamps in accordance with the invention.

MORE DETAILED DESCRIPTION

As can be seen in FIGS. 1 to 5, the invention provides a set of clamps 2A to 2E for fixing a cylindrical element, each clamp being constituted by a block provided in one of its faces with a respective channel 3A to 3E for receiving the cylindrical element, and also provided with clamping means.

The channels are centered in each block in the conventional manner and the clamping means are constituted by two bores 4A and 5A each designed to receive a bolt and disposed on either side of the corresponding channel 3A.

The assembly 1 comprises a plurality of clamps 2A to 2E having channels of different dimensions and interconnected by at least breakable element. The breakable element can be broken manually or using a tool such as a screwdriver. In the conventional manner, it is advantageously constituted by fine connection tongues 6 and 7.

The clamps are disposed in alignment side by side so as to form a strip of clamps, with the size of the channel increasing from the first clamp 3A to the last clamp 3E.

In the embodiment shown in FIGS. 1 and 2, two side sprues 8 and 9 are molded integrally along either side of the strip and they are connected to the clamps by breakable tongues. At least one of the sprues 9 has a cavity 9A for making it easier to detach the sprue 9, e.g. by inserting the tip of a screwdriver into the cavity 9A.

In FIGS. 3 to 5, the strip is shown without any side sprues.

The assembly 1 is advantageously a casting of metal, and preferably of zamak.

The sections of the channels 3 are designed to enable a range of cable diameters to be held. To do this, and as can be seen particularly clearly in FIGS. 3 and 6, each channel 3 has a bottom-of-channel portion 30 of circular cross-section extended on either side by two end portions 31 of sloping right cross-section.

Each channel 3 has parallel grooves 32 extending perpendicularly to the longitudinal axis of the channel.

By way of example, a strip as shown in FIGS. 3 to 5 can be used for fixing cables having diameters lying in the range 7.5 mm to 25 mm. The first clamp 2A can be used for cables having diameters lying in the range 7.5 mm to 9.5 mm, the second clamp 2B with cables having diameters lying in the range 9.5 mm to 12 mm, the third clamp 2C with cables having diameters lying in the range 12 mm to 15.5 mm, the fourth clamp 2D with cables having diameters lying in the range 15.5 mm to 19.5 mm, and the fifth clamp 2E with cables having diameters lying in the range 19.5 mm to 25 mm (with tolerance of plus or minus 0.5 mm).

A preferred application of the invention is shown in FIG. 7. The cylindrical element is an optical fiber cable, and more particularly it is a guard cable having incorporated optical fibers 10 for fitting to electrical equipment, e.g. a cable splice device 14 for use in an overhead installation, as shown in FIG. 8.

Two clamps 2 and 2' are selected from strips 1 so as to match the diameter of the guard cable, and they are mounted so as to receive the cable in their respective channels. Two bolts 11 and 11' are put into place in the bores of the clamps, and they serve to urge the two clamps against the cable by being tightened with respective nuts 12 and 12' with interposed washers 13 and 13'.

For fixing clamps to a support piece, e.g. by means of a retaining member interposed so as to be held between the heads of the bolts and the clamps, the clamps can also be used to support cables as shown in FIG. 8, and they are capable of supporting traction forces of at least 100 kg.

What is claimed is:

1. A set of fixing clamps from which two clamps are selected for fixing a cylindrical element, the set of fixing clamps comprising:
   a plurality of clamps detachably connected to one another via at least one breakable element,
   each of said plurality of clamps constituted by a block provided on one of its faces with a channel for receiving the cylindrical element, and clamping means for fixing the cylindrical element,
   wherein the channel of each of said plurality of clamps has a different dimension, so that the two clamps are selected from said plurality of clamps which correspond to the dimension of the cylindrical element to be fixed.

2. A set according to claim 1, wherein the clamps are disposed in side-by-side alignment so as to form a strip of clamps, the sizes of the channels increasing from a first clamp to a last clamp.

3. A set according to claim 1, wherein each channel has a bottom-of-channel portion of circular cross-section extended on either side by two end portions which slope toward each other at a right angle.

4. A set according to claim 1, wherein each channel is provided with parallel grooves extending perpendicularly to the longitudinal axis of the channel.

5. A set according to claim 1, wherein said clamping means are constituted by bores each for receiving a respective bolt.

6. A set according to claim 1, said set being made of cast metal.

7. A set according to claim 6, said set being made of zamak.

8. A set according to claim 1, wherein the cylindrical element is an optical fiber cable.

9. A set according to claim 8, wherein the cylindrical element is a guard cable having incorporated optical fibers for fitting to electrical equipment.

10. A set of fixing clamps from which two clamps are selected for fixing a cable having incorporated optical fibers in an overhead installation, the set of fixing clamps comprising:
    a plurality of clamps detachably connected to one another via at least one breakable element,
    each of said plurality of clamps constituted by a block provided on one of its faces with a channel for receiving the cable, and clamping means for fixing the cable,
    wherein the channel of each of said plurality of clamps has a different dimension, so that the two clamps are selected from said plurality of clamps which correspond to the dimension of the cable to be fixed.

* * * * *